United States Patent [19]

Hoffmann

[11] Patent Number: 4,459,861

[45] Date of Patent: Jul. 17, 1984

[54] MEASURING TURBINE FOR HIGH VOLUME, HIGH VISCOSITY FLUIDS

[75] Inventor: Helmuth Hoffmann, Bergisch-Gladbach, Fed. Rep. of Germany

[73] Assignee: Hydrotechnik GmbH, Limburg, Fed. Rep. of Germany

[21] Appl. No.: 364,531

[22] Filed: Apr. 1, 1982

[30] Foreign Application Priority Data

Apr. 1, 1981 [DE] Fed. Rep. of Germany ....... 3112960

[51] Int. Cl.³ .............................................. G01F 1/12
[52] U.S. Cl. .............................. 73/861.78; 73/861.83; 138/44
[58] Field of Search ........... 73/861.77, 861.78, 861.83, 73/861.89, 272 R, 861.82; 138/44, 45; 285/177

[56] References Cited

U.S. PATENT DOCUMENTS

| | | | |
|---|---|---|---|
| 2,419,453 | 4/1947 | Kocevar | 285/177 |
| 2,934,952 | 5/1960 | Gehre | 73/861.89 |
| 3,164,020 | 1/1965 | Groner et al. | 73/861.78 |
| 4,105,049 | 8/1978 | Anderson | 138/44 |
| 4,116,477 | 9/1978 | Wahoski | 285/177 X |
| 4,337,655 | 7/1982 | Sundstrom et al. | 73/861.77 X |
| 4,404,861 | 9/1983 | Wass | 73/861.89 X |

FOREIGN PATENT DOCUMENTS

| | | | |
|---|---|---|---|
| 1576 | of 1910 | United Kingdom | 138/44 |
| 180444 | 6/1922 | United Kingdom | 138/44 |

*Primary Examiner*—S. Clement Swisher
*Assistant Examiner*—Brian R. Tumm
*Attorney, Agent, or Firm*—Schwartz, Jeffery, Schwaab, Mack, Blumenthal & Koch

[57] ABSTRACT

A measuring turbine with a turbine rotor arranged in a flow channel of a measuring tube comprises flow rectifiers, a turbine rotor and an adjusting element capable of influencing the rotating velocity of the turbine rotor through the fluid to be measured. The adjusting element is located after the discharge flow rectifier in the flow channel and is designed to also serve as the discharge connection and the connector fitting. The adjusting element is provided with an element varying the flow cross section of a definite size. The adjusting element preferably has an internal cone with an orifice plate in front of it in the direction of the flow.

10 Claims, 4 Drawing Figures

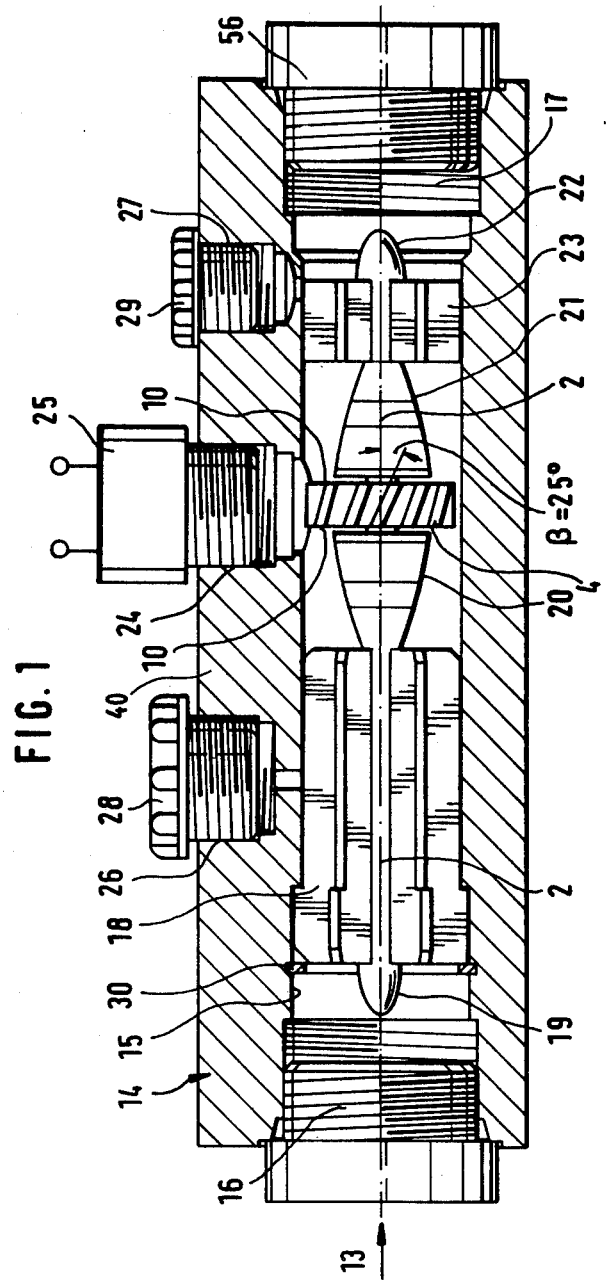

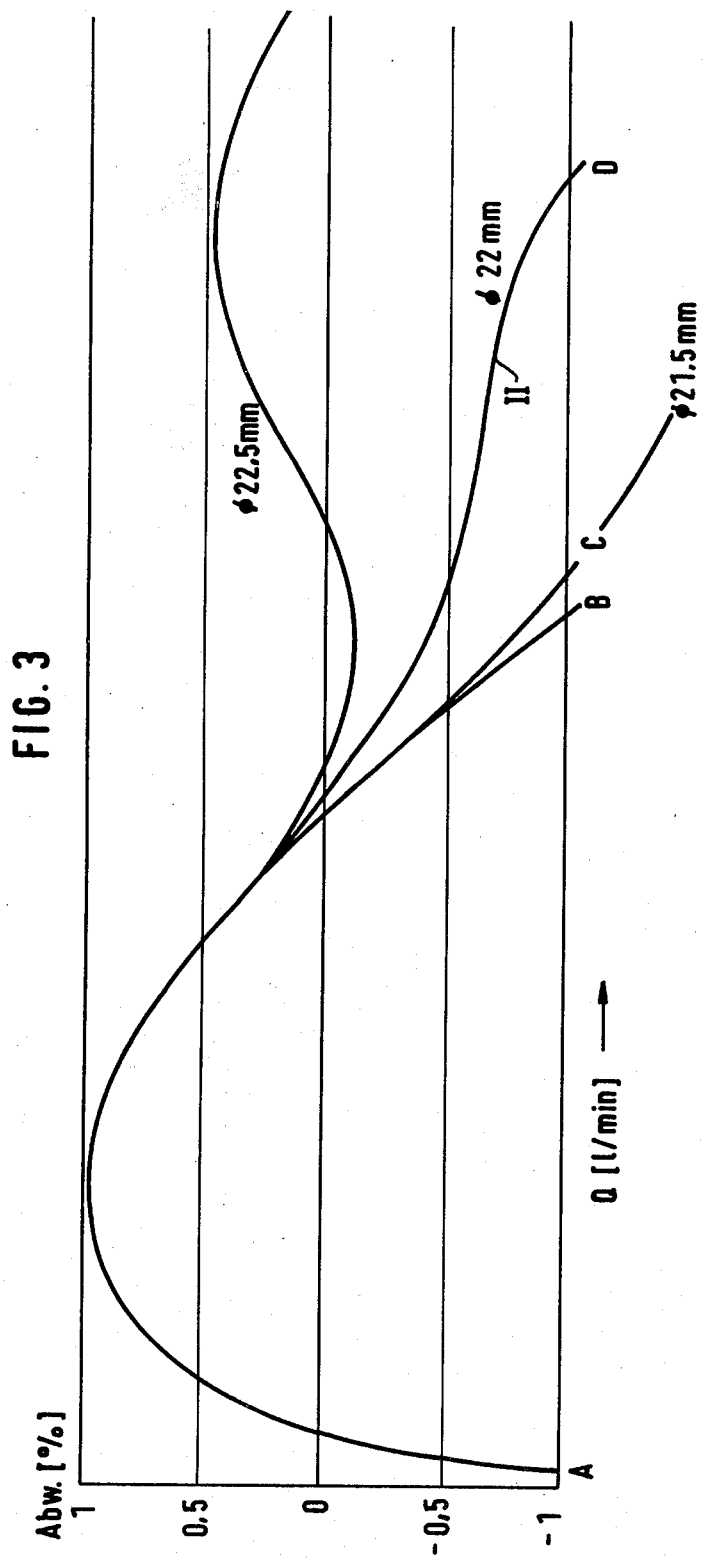

MEASURING TURBINE FOR HIGH VOLUME, HIGH VISCOSITY FLUIDS

BACKGROUND OF THE INVENTION

1. Field of the Invention

The invention concerns a measuring turbine with a turbine rotor arranged in a flow channel of the measuring housing. The turbine rotor is positioned such that its axis is in the direction of the flow. The turbine rotor is also equipped with flow rectifiers in front of and after the turbine rotor.

2. Background of the Prior Art

Flow meters of this type are known per se and belong to the group of the intermediate volume counters operating on the principle of the so-called Woltmann impeller wheel counter and being particularly suitable for the accurate measurement of the instantaneous volume flow of fluids. A turbine rotor with a low mass centeringly located in a tubular body is exposed to flow in the axial direction with the medium to be measured impacting the turbine disk in the form of a quasi laminar flow after having been quieted by means of flow rectifiers. The rpm of the turbine disk is proportional to the mean flow velocity and thus corresponds over a broad range to the volume passing through.

The rpm of the turbine disk is preferably taken off with a low reaction force through the non-magnetic tubular body by means of an inductive transducer. The number of pulses per unit time is proportional to the instantaneous volume flow, while even in the case of the minimum volume flow, the rpm of the turbine disk is not affected by the inductive pulse takeoff. However, hydraulic losses are dependent on viscosity and are functions of the Reynolds number, respectively.

By selecting high quality, low friction bearing materials and by reducing the impeller mass, efforts have been made to keep the braking torque as low as possible in order to preserve a maximum effect, i.e., a broad measuring range of the counter or expansion of the measuring range. This affects the characteristic of the error curve. Such measures, however, largely depend on the angle of the blades to the axis of the turbine disk and on the number of blades, whereby the circumferential velocity of the impeller wheel is also affected.

Attempts to make the known turbine flow meters into an accurately operating measuring instrument have led over the course of time to improvements concerning the configuration of the impellers.

There are known configurations with two different slopes, for example, wherein a steeper slope is used in the forward part of the disk than in the rear part. This results in the fact that in the case of small flow volumes the impact is more intensive so that even with flow volumes, rpm ranges are attained whereby the lower limit of the measuring range may be lowered. In order, however, to avoid reaching excessively high rpm ranges leading to increased wear, the rear part of the impeller disk is given with a less steep slope, thereby providing for the necessary equalization of velocity.

To provide an impeller wheel with two different inclinations is expensive in production with the additional disadvantage that such impeller wheels are not suitable for extremely broad measuring ranges.

As the result of manufacturing tolerances and different friction effects, the error characteristics of measuring turbines, even those made from the same blueprints, have different error curves. The majority of the turbines exhibit strongly declining error characteristics toward high flow volumes, which greatly restricts their measuring range with respect to its upper limit. Conventional measuring turbines have error curves with a slope in the case of extremely high flow volumes, such that the turbines cannot be used for measuring in these high ranges.

SUMMARY OF THE INVENTION

The present invention concerns in particular measuring turbines of the aforementioned type, suitable for extremely large volume flows, wherein in view of the state of the art, an increase in the error limit must be accepted. Such erroneous deviations occur in particular with high viscosity fluids, for example, in the pressure media of hydraulic installations.

The present invention is based on the discovery that it is possible to affect the rotating velocity of the turbine rotor in a defined and controlled manner by influencing the fluid flow leaving the measuring turbine. In this fashion, error limits corresponding to those occurring in the measuring ranges that are usually in the present state of the art may be maintained even in the case of extremely high flow volumes.

It is, therefore, an object of the invention to provide measures whereby the rotating velocity of the measuring turbine may be affected in the above-mentioned manner in the case of extremely high flow volumes (up to flow velocities of 15 m/s with high viscous fluids and at higher velocities with fluids of lower viscosities) such that the error limits occurring will not exceed the aforementioned measure.

These and other objects are attained according to the invention by utilizing an adjusting element in the conventional type measuring turbine described in the introduction. The adjusting element affects the rotating velocity of the turbine rotor through the fluid to be measured. It is arranged in the flow channel after the outlet flow rectifier. It also simultaneously serves as the discharge connection and outlet fitting while being equipped with an element of a definite size to vary the flow cross section.

According to the invention, the adjusting element is replaceable.

The element varying the flow cross section of the adjusting element in a further development of the invention has the configuration of the inner cone of the discharge connection for the measuring turbine. By means of the choice of suitable cones, it is now possible to reverse the slope of the error curve to the extent desired.

For the purpose of adjusting a measuring turbine to establish its error characteristic, it is of particular advantage to equip the adjusting element with inner cones of different inclination for the equilization of error curves that are different due to the manufacturing process.

In a further embodiment of the invention, the adjusting elements are provided with orifice plates of different internal diameters to equalize error curves that are different due to the manufacturing process.

The present invention renders it feasible to affect the velocity of the turbine rotor of a measuring turbine so that usable and reproducible measured values may be attained in the case of extremely high flow volumes and with strongly scattering initial curves.

BRIEF DESCRIPTION OF THE DRAWINGS

The invention will be explained in more detail hereinafter with the aid of illustrations in the drawings attached hereto. In the drawings:

FIG. 1 shows a longitudinal cross section through a measuring turbine;

FIG. 3 illustrates the characteristic error curves when different adjusting elements are used, in the example of a single initial error curve.

FIG. 1 shows a measuring turbine in a longitudinal section approximately in its actual size. The measuring housing 14 surrounds a round flow channel 15 and is equipped on the input side with an inlet 16 and on the discharge side with an outlet 17, and discharge connector 56. The inlet and outlet connectors are both equipped with threads. The arrow 13 indicates the direction of flow of the flow medium to be measured. Immediately following the inlet connection, a flow rectifier 18 is located in the flow channel 15. The flow rectifier comprises six baffle plates in the embodiment exemplified. Each baffle plate is fastened to a ring 30 on the inlet side and simultaneously serves as the holder for the rotor axle 2. In order to reduce the formation of vortices, a flow form 19 precedes the rotor axle 2. Further flow forms 20, 21 and 22 are located in front and after the rotor disk 4 and at the outlet end of the axle 2. The flow form 20 has a configuration, such that the fluid flowing against the rotor disk is directed into the range of the rotor blades. The flow form 21 is followed immediately by a further baffle arrangement 23, also serving to rectify the flow.

Figure 2A:
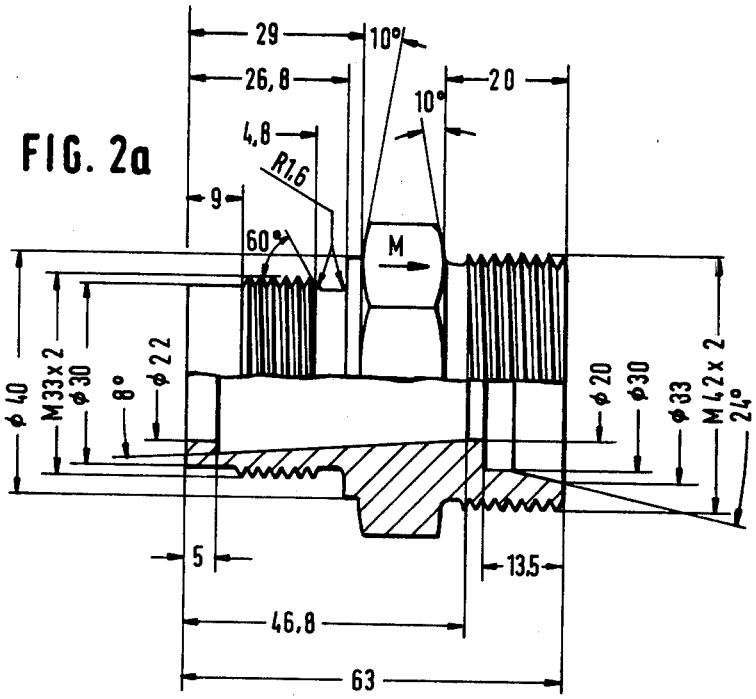
FIG. 2a illustrates a longitudinal section through a discharge connection with the configuration of a connecting fitting, wherein all of the numbering represents measuring units of an example of embodiment.

Bore holes 26 and 27 are present in the housing 14 to receive suitable pressure and temperature transducers. These holes may be closed off by means of the caps 28 and 29. The openings of the transducer bores are located in the inlet area of the flow rectifiers 18 and 23 so that they have no appreciable effect on the turbine rotor 4.

The housing wall 40 of the flow channel 15 has a bore 24, arranged opposite the turbine rotor 4. An inductive measuring detector 25 (also referred to as an inductive pulse pickup) is located in the bore 24. The depth of insertion of inductive measuring detector 25 is variable.

FIG. 2a shows a longitudinal section through discharge connection 56, which has the configuration of a connecting fitting. FIG. 2a contains the most important dimensions of one embodiment, in millimeters.

Figure 2B:
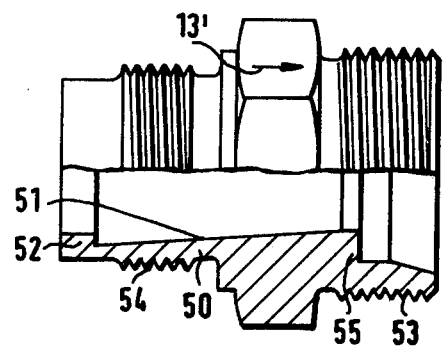
FIG. 2b shows a longitudinal section as in FIG. 2a without units of measurement, but with reference symbols.

FIG. 2b shows the same embodiment of FIG. 2a, but with reference symbols. The discharge connection 56 is equipped with threads and may thus be used as a connector fitting. The arrow 13' on the hexagon indicates the direction of flow. The discharge connection 56 is further equipped on the side of the flow inlet with another external threading 54, so that the discharge connectors may be interchanged in a simple manner. An inner orifice plate 52 is located on the inlet side. This plate is integrally connected with the inner cone 51. As seen from FIG. 2a, the inner cone 51 in the embodiment shown has a slope of 8°, while the internal diameter of the orifice plate is 22 mm. The overall length of the inner cone with the orifice plate amounts to 46.8 mm, with the end of the cone attaining a diameter of 20 mm. A collar 55 is located at the discharge end of the cone 51, against which a connecting tube, not shown, is abutting in a flush manner and without steps.

FIG. 3 shows an error characteristic extending over an error range of ±1% and valid with the dimensions shown of the measuring turbine to a flow rate of 500 liters per minute. The error characteristic of a conventional measuring turbine begins at Point A and intersects the −1% error limit at Point B. The flow rate here is approximately 280 liters per minute. In this range, the device according to the invention becomes effective and the use of an adjusting element with the dimensions of FIG. 2a, i.e., with an orifice plate of 22 mm and an inner cone slope of 8%, yields a characteristic error curve II intersecting the −1% limit in Point D. If an orifice plate with a diameter of 21.5 mm is used, the characteristic error curve intersects at Point C, while in the case of an orifice plate of 22.5 mm, the intersection of the corrected error curve with the −1% limit could no longer be determined with the above-mentioned high flow rates.

It has been discovered in the course of the present invention that it is possible to affect the course of the error characteristic by means of suitable fluid mechanical measures so that in the range of steeply declining negative curve segments, reversals of the slopes and their control may be achieved. This leads to limits of the measuring range which are determined only by the dimensioning of the measuring turbines and the limiting values of pressure losses within the measuring tube associated with it and by the limit values of permissible flow velocities.

The specification and drawings set forth preferred embodiments of the invention. It should be noted, however, that the invention is not limited to those specific embodiments and methods specifically disclosed, but extends instead to all embodiments, substitute and equivalent constructions falling within the scope of the invention as defined by the claims.

What is claimed is:

1. A turbine for measuring the flow within a flow channel comprising:
    a flow channel housing;
    a turbine rotor arranged in the flow channel with its axis in the direction of flow;
    an inductive pulse detector mounted in said flow channel housing adjacent said turbine rotor;
    an outlet flow rectifier mounted in said housing immediately downstream of said turbine rotor; and
    a flow adjusting element immediately downstream of said outlet flow rectifier comprising a discharge connector having an inner orifice plate followed by a varying internal circumference gradually narrowing in the direction of flow.

2. The turbine of claim 1, wherein said adjusting element further comprises means for connection to said flow channel housing.

3. The turbine of claim 2, wherein said means comprise external threading.

4. The turbine of claim 1, wherein said adjusting element displays an internal circumference at least partially in the shape of a cone, said cone having a larger end and a smaller end, said larger end being positioned closer to said outlet flow rectifier.

5. The turbine of claim 4, wherein the internal circumference of said adjusting element displays the shape of a plurality of cones intersecting and adjacent one another.

6. The turbine of claim 4 wherein said cone has an inner slope of 8°.

7. The turbine of claim 6 wherein said inner orifice plate has a diameter of about 21.5 mm.

8. The turbine of claim 6 wherein said inner orifice plate has a diameter of about 22.5 mm.

9. The turbine of claim 4 wherein said inner orifice plate is annular.

10. The turbine of claim 1 comprising a plurality of adjusting elements interchangeable with one another and having internal circumferences of differing slopes from one another.

* * * * *